UNITED STATES PATENT OFFICE.

ROBERT A. GETTINGS, OF MARION, KENTUCKY.

IMPROVEMENT IN MEDICAL COMPOUNDS.

Specification forming part of Letters Patent No. 132,275, dated October 15, 1872.

*To all whom it may concern:*

Be it known that I, ROBERT A. GETTINGS, of Marion, in the county of Crittenden and State of Kentucky, have invented a new and Improved Medical Compound for the cure of hog-cholera, of which the following is a specification:

This invention has for its object to furnish a compound which shall be an infallible remedy for the cure of hog-cholera; and it consists in the combination of the various ingredients in the proportions specified, viz: Green protosulphate of iron or copperas, one pound; extract of logwood, one pound; alum, one-half pound; sulphate of copper, one-half pound; arsenic, one ounce; black antimony, six ounces.

The above ingredients are compounded in the manner specified, and are then packed in bottles for sale or use.

To administer the medicine to the hogs it is only necessary to dissolve a suitable quantity of the same in hot water, which is then mixed with meal or bran or other article of food.

In case the hogs should not eat the food mixed with the medicine it will be found necessary to forcibly administer the compound in solution by the ordinary method of "drenching."

Having thus described my invention, what I claim as new, and desire to secure by Letters Patent, is—

The herein-described compound for the cure of hog-cholera, composed of the various ingredients in the proportions set forth.

ROBERT A. GETTINGS.

Witnesses:
ROBERT F. HAYNES,
A. T. TURNER,
R. H. WORD.